March 22, 1955  E. K. RALSTON  2,704,548
DISK SPRING SUPPORT FOR VALVE DIAPHRAGM
Filed Nov. 15, 1949
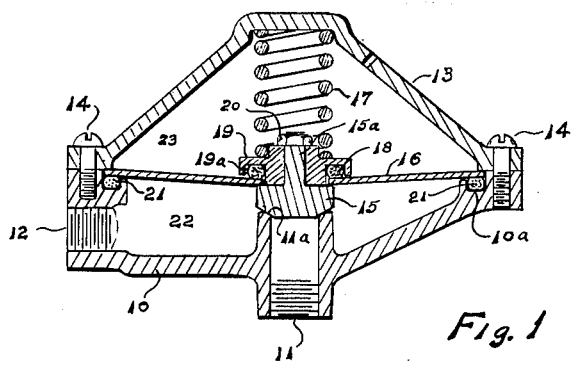
Fig. 1
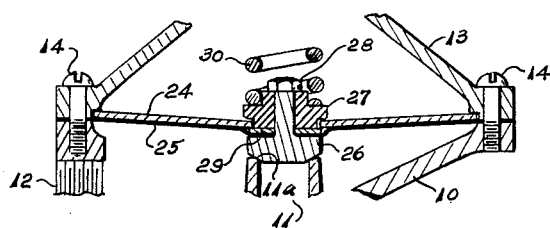
Fig. 2
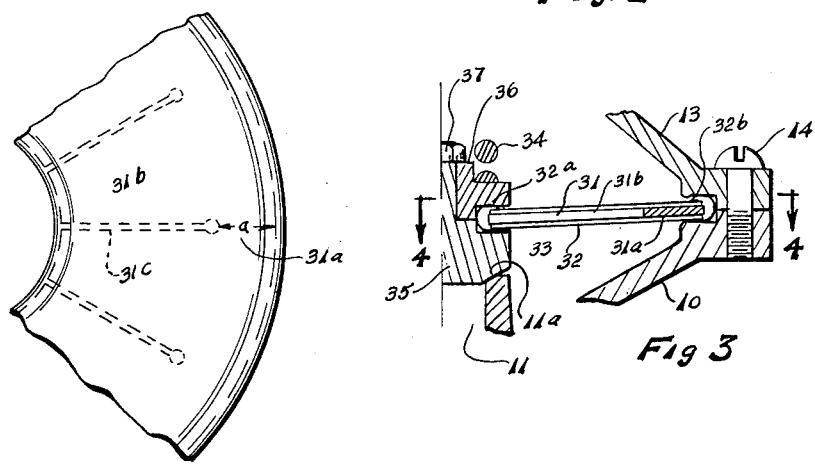
Fig. 3
Fig. 4
ELDON KIPP RALSTON
INVENTOR.
BY
Hyde, Meyer, Baldwin & Doran
HIS ATTORNEYS

United States Patent Office 2,704,548
Patented Mar. 22, 1955

2,704,548
DISK SPRING SUPPORT FOR VALVE DIAPHRAGM

Eldon Kipp Ralston, Cleveland Heights, Ohio

Application November 15, 1949, Serial No. 127,489

9 Claims. (Cl. 137—469)

This invention relates to improvements in a disk spring support for valve diaphragms.

One of the objects of the present invention is to provide a valve diaphragm extending between a fixed abutment member and a movable member, the diaphragm being completely sealed off where it engages both of said members and being completely flexible throughout its range of movement.

Another object of the present invention is to provide in a pressure relief or regulating valve mechanism, a flexible diaphragm which is completely supported over its entire surface in any of the valve operating positions.

Another object of the present invention is to provide in a relief or regulating valve mechanism, a flexible diaphragm coacting with a spring supporting means which will deflect with the movement of the valve and, in any position of the valve, support the diaphragm in its entirety.

A further object of the invention is to provide spring supporting means coacting with a flexible diaphragm as described in the preceding paragraph, wherein said spring supporting means is the principal spring loading means of the valve.

A further object of the present invention is the provision of a flexible diaphragm completely supported over the entire surface thereof by spring supporting means, said diaphragm and spring supporting means being pressure responsive so that the pressure exerted on the diaphragm, and therefore upon the spring supporting means, will cause deflection of such means with coordinated movement of the valve mechanism.

Other objects and advantages of the present invention will be apparent from the drawings and description and the essential features will be summarized in the appended claims.

In the drawings,

Fig. 1 is a central sectional view through one form of my device;

Fig. 2 is a fragmental sectional view taken in a position similar to Fig. 1 and showing a second modification of my invention;

Fig. 3 is a fragmental sectional view taken in positions similar to Figs. 1 and 2 and showing a third modification of my invention; while Fig. 4 is a fragmental view taken along the line 4—4 of Fig. 3 showing a fragmental plan view of the diaphragm and disk spring portion of Fig. 3.

Conventional relief, regulating and control valves of various types often use diaphragms for two general purposes, namely: (a) To provide a flexible pressure-tight surface against which fluid pressure may act in order to actuate a valve. This eliminates piston, packing glands and the like which generally stick. (b) To provide a pressure-tight seal between two parts of a valve in order to prevent undesirable fluid from getting into some part of a valve or to prevent the fluid from leaking out.

In conventional valves for low pressure use, the diaphragm is generally made of rubber or rubber-impregnated cloth which in turn is supported by a back-up plate of less diameter than the diaphragm itself. This makes a very flexible unit, which is highly desirable, but it is subject to the difficulty that the diaphragm cannot be supported in its entirety and thus at higher pressures, the rubber-like material of the diaphragm is blown out between the supporting plate and the clamped edge. To prevent this, one must use either a heavier fabric or metal diaphragms. However, in this case, the desired flexibility is lost. Furthermore, with any kind of diaphragm which is clamped around the outer edge and only partially supported by a backing plate, the diaphragm will always "balloon out" to some extent between the clamped outer edge and the supporting plate. Thus, as the valve mechanism moves, there results a change of the effective area against which the fluid pressure is acting which is highly undesirable.

It is my belief that the ideal diaphragm for use in pressure relief and regulating valve mechanisms is one which will be very flexible throughout the entire movement of the valve mechanism; which is completely supported or self-supporting in position; which is capable of standing high pressures, and one in which the effective area does not change as the valve mechanism moves through its operating range.

The present invention accomplishes all of the above objectives, along with other advantageous results as will be apparent from the following description.

In Fig. 1, I have shown one modification wherein an annular spring washer of strong metallic construction is flexibly supported for movement by means of O-ring seals at its inner and outer perimeters. In Fig. 2, I have shown a similar annular metallic washer which completely backs up a very flexible diaphragm over the entire operating area thereof. In Fig. 3, I have shown an annular spring washer coated with rubber-like material to prevent leakage through the finger portion of the washer and to seal the outer and inner perimeters of the washer as will be presently described.

In the form of my device shown in Fig. 1, I have shown a valve body 10 provided with ports 11 and 12. Port 11 may be used as the inlet with port 12 as the outlet. In this case, the valve is of the "pop" type where the operating pressure is exerted against the underside of the valve disk, in which case, the diaphragm is used to seal off the spring or springs and to prevent the escape of fluid through the valve parts when the valve discharges. If the port 12 is utilized as the inlet and port 11 as the outlet, then the valve is of the "diaphragm" type, in which case the operating pressure is exerted directly against the underside of the diaphragm. The valve body has a cover portion 13 which is secured to the body portion 10 by a plurality of screws 14. The movable member of the mechanism is a valve disk 15 which coacts with a valve seat 11a connected or communicating with the port 11. The valve disk is carried by the annular disk washer or annular spring 16. The manner of calculating and constructing annular disk washers like that shown at 16 of the Belleville spring type is clearly disclosed and claimed in my copending application Serial No. 715,195, filed December 10, 1946, to which reference may be had for a more complete disclosure of these problems. If the Belleville washer has an average effective thickness $t$ and a cone height $h$ when the washer is unstressed, then the washer as assembled in Figs. 1, 2 and 3 should have an $h/t$ ratio approximately between 1.0 and 2.75 and the spring washer as assembled should have an initial compression between 0.8 and 1.4 of its thickness as taught in my above mentioned copending application Serial No. 715,195. The cone height $h$ in Figs. 1 and 2 refers to the entire height of the frusto-conical disk 16 or 24 respectively. In Figs. 3 and 4 the cone height is measured for the washer solid portion 31a only.

An annular spring washer 16 of the Belleville type may be utilized as the sole loading for the valve disk 15, or it may be supplemented by a helical spring 17. If the annular member 16 is a flat washer, supplying little or no spring action, then the helical spring 17 may provide the entire spring load for the valve disk 15.

The diaphragm 16 may be a washer made of suitable material to resist corrosion due to the exposure to the fluid passing through the valve. This washer may be thin where the pressure acting against it is small, or of thicker material where it is required to carry an appreciable part of the load acting against the mechanism as described in my copending application Serial No. 715,195. The inner perimeter of the washer 16 is sealed by means of an O-ring of resilient rubberlike material 18 which is clamped in position by the load ring 19 which embraces the stem 15a of the valve disk 15 and is held in position by a nut 20. The load ring 19 has a downwardly opening annular recess 19a in which the O-ring 18 fits. A second O-ring 21 engages the outer periphery of the washer 16 in a sealing manner on the side of the washer opposite the ring 18. In the present instance, an annular groove 10a is cut in the body 10 to receive the O-ring 21 just beneath the outer periphery of the washer 16. When the cover 13 is secured to the valve body 10, the O-ring 21 is held in the positions shown in Fig. 1.

It results from the above construction of Fig. 1 that the inner and outer perimeters of the spring washer 16 are tightly sealed against pressure and yet the inner and outer edges of the member 16 which acts like a diaphragm are not so tightly held as to prevent these edges from rotating in a plane passing through the polar axis of the washer. In other words, the inner and outer edges of the spring washer 16 rock on the sealing rings 18 and 21 as the spring washer flexes to permit the valve disk 15 to move from the positions shown in Fig. 1 to a position where the valve disk is raised from the seat 11a. Thus, no leakage can occur between chamber 22 and chamber 23 throughout the operating range of the mechanism.

In the modifications shown in Fig. 2, the body 10 with ports 11 and 12 and a top cover 13 are all intended to be the same as described in connection with Fig. 1. In this case, the metal disk washer 24 of metal or the like is similar to the washer 16 of Fig. 1. On the side exposed toward the controlled fluid, the washer 24 is protected by a more flexible and resilient washer member or diaphragm 25. This is adapted to protect the washer 24 from the operating fluid and the member 25 may be of rubber, rubber-like material, plastic or even a thin disk of a corrosion proof metal such as bronze, Monel metal and the like. A fluid tight joint is provided at both the inner and outer perimeters of the diaphragm member 25. At its outer perimeter, the diaphragm member is clamped by means of the screws 14 between the body member 10 and the cover member 13. At its inner periphery, the diaphragm 25 is clamped between the valve disk 26 and a load ring 27 which is held on a central stem of the valve disk by means of a nut 28. A small washer 29 is held between the load ring and the valve disk to clamp the inner edges of the diaphragm 25 while at the same time providing a seat for the inner perimeter of the washer 24 as it flexes up and down.

As in the case of Fig. 1, a supplementary spring 30 may be provided similar to the helical spring 17 of the first described form. It will be understood by those skilled in this art, that my invention is operative whether or not the helical spring 30 is added to the other portions of Fig. 2.

The operation of the form of my device shown in Fig. 2 is quite similar to the form shown in Fig. 1. The Belleville type spring washer 24 flexes in a well known manner protected and sealed by the diaphragm member 25. The device of Fig. 2 may be made as flexible as desired because the thin resilient diaphragm 25 is supported over its entire area and the combined device may be made to withstand as high pressures as desired. In a diaphragm type valve, or one using a diaphragm as a seal, where high capacity and appreciable movement is necessary, the arrangement must be very flexible. This is not possible when a diaphragm is not supported over its entire area, because, in such a case, the unsupported areas of the diaphragm will not withstand the high pressure. The arrangement of Fig. 2 provides a very flexible diaphragm which may be used under high pressures, producing not only a sensitive valve, but one of high capacity due to the high degree of movement permitted.

Another embodiment of my invention is shown in Figs. 3 and 4. Here a disk washer 31 of the Belleville type is totally encased in a coating 32 of rubber-like material having resilient characteristics. The side of the Belleville washer near the chamber 33 and exposed to the fluid, is protected by the coating of rubber-like material. The rubber-like material may be formed into beads, as shown at 32a and 32b, which provides a tight seal at the inner and outer perimeters of the Belleville washer similar to the seals shown at 18 and 21 in Fig. 1. The beads 32a and 32b are sufficiently resilient so that the edges of the Belleville washer may rotate freely when flexed. The washer 31 may be slightly frusto-conical so as to provide a spring washer of the Belleville type, as has already been mentioned. The washer 31 might also be flat if there were only a minor load to be carried. In any case, the thickness of the washer 31 will be in proportion to the load to be carried. Also, an auxiliary helical spring 34 may be used analogous to the springs 17 and 30 which have already been mentioned, but which may be omitted in practicing my invention as I have previously stated.

I may incorporate in the washer 31 of Fig. 3, a feature shown by itself and not in combination with a diaphragm in my copending application Serial No. 127,490, filed November 15, 1949, now Patent No. 2,634,123, granted April 7, 1953, to which reference may be had for a more complete disclosure and claims covering this general type of washer. In order to provide a washer which may be deflected farther than a solid washer without over stressing the metal, I have provided a washer having a solid outer ring 31a from which there extend radially inwardly the fingers 31b. This is accomplished by cutting the radial slots 31c in the washer. As mentioned in the copending application, if a spring washer of the Belleville type is desired, the thickness and radial width of the solid portion 31a of the washer of Figs. 3 and 4 is calculated to give the proper Belleville spring load. This utilizes the solid radial width $a$ as indicated in Fig. 4. The movement of the solid ring 31a under deflection is multiplied by the length of the fingers 31b. If this finger length is marked $c$ then the total radial width of the washer is $a$ plus $c$ equals $b$. As described in my Patent No. 2,634,123, the solid ring 31a might also be provided at the radially innermost portion of the washer 31 with the fingers extending radially outwardly therefrom or the solid portion might be annularly in the middle of the washer with fingers extending radially inwardly and outwardly. The effective length of the fingers $c$ should be more than 40 per cent of $b$. If the total cone height of the washer 31, including the fingers 31b, is $h'$; then $h'$ multiplied by $a$ and divided by the product of $b$ multiplied by $t$ should equal a number between one and five, as taught in my above mentioned Patent No. 2,634,123. Also as taught in the same patent, the number of fingers 31b should be greater than three, and there should be a space between said fingers at all times in the stressed condition of the washer.

It will be noted in Figs. 3 and 4 that the coating 32 of rubber-like material completely covers the slots 31c so that no leakage through the washer 31 is possible and the thickened beads 32a and 32b completely seal the inner and outer perimeters of the washer. Here again, the main body has been indicated by the reference numeral 10 and the cover by the reference numeral 13, these parts being held together by the screws 14 as described in the previous forms of my device and holding the outer bead 32b between the portions 10 and 13 as shown in Fig. 3. The valve disk 35 coacts with valve seat 11a as in the previously described forms. A load ring 36 is secured to a central stem of the valve disk 35 by means of a nut 37 and clamps the inner bead 32a between the ring 36 and the valve disk 35 as shown in Fig. 3.

In all forms of my device, the washers 16, 24, and the solid portion 31a of washer 31 are calculated according to the teachings of my copending application Serial No. 715,195, filed December 10, 1946, to which reference may be had for a more complete description of the manner of calculating these washers to carry out the intent and purpose of my invention.

It should be noted that in all forms of my invention, I have used washers 16, 24 and 31a whose cross-section remains substantially rectangular throughout the range of deflection. This avoids a change in the effective area against which the fluid pressure acts.

What I claim is:

1. In a valve body member having inlet and outlet ports and a valve disk member controlling fluid flow through one of said ports, the combination of an annular Belleville type spring washer in the form of an almost flat truncated cone of sheet material having spring characteristics and having an annular ring of uninterrupted sheet material extending completely around said washer, said washer having its inner and outer perimeters substantially in engagement with said members, said washer being under stress between said members so that the spring characteristic of said washer always tends to hold said valve disk member in position closing said port, and sealing means preventing leakage through and around said washer.

2. The combination of claim 1 wherein said valve body member has a fluid flow body portion and another portion, said washer providing a fluid-impervious partition between said portions, and said sealing means comprising circular seals where said inner and outer perimeters of said washer engage said members.

3. The combination of claim 1 wherein said valve body member has a fluid flow body portion and another portion, said washer positioned between said body portions, a thin flexible fluid impervious diaphragm on the fluid-flow-exposed side of said washer, said diaphragm providing a partition between said portions, and said diaphragm providing said sealing means where said inner and outer perimeters engage said members.

4. The combination of claim 1 wherein said valve body member has a fluid flow body portion and another portion, a flexible fluid impervious coating substantially completely covering both sides of said washer, said covered washer providing a fluid impervious partition between said portions, and said coating providing said sealing means where said inner and outer perimeters engage said members.

5. A valve assembly comprising a valve body member having a fluid flow body portion and another portion, there being inlet and outlet openings in said fluid flow body portion, means for regulating passage of fluid between said openings comprising a valve seat in said other portion of said valve body and a cooperating valve, spring loading means comprising a Belleville spring washer providing a fluid-impervious partition between said body portions, said washer having its inner and outer perimeters substantially in engagement with said members, sealing means between said inner and outer perimeters and the associated members, said spring washer being initially compressed an amount between 0.8 to 1.4 of its thickness and having an $h/t$ ratio of from approximately 1 to 2¾, and said washer being under stress between said members so that the spring characteristic of said washer always tends to hold said valve disk member in position closing against said seat.

6. A valve assembly comprising a valve body member having a fluid flow body portion and another portion, said fluid flow body portion having inlet and outlet ports and a valve disk member controlling fluid flow through one of said ports, a Belleville spring washer annular in plan and having inner and outer perimeters respectively in engagement with said valve body member and said valve disk member, said washer having an imperforate ring of radial width $a$ and effective average thickness $t$ and with fingers rigidly connected with said ring and extending in at least one direction radially therefrom, said fingers of effective length $c$ beyond said ring whereby $a$ plus $c$ equals effective washer lever arm $b$, $c$ being more than 40 per cent of $b$, the cone height of said washer in free unstressed condition being substantially $h$, the number of said fingers being greater than three, there being a space between said fingers at all times in stressed condition of said washer, twice the value of $h$ multiplied by $a$ and divided by the product of $b$ multiplied by $t$ equaling a number between 1 and 5, and a flexible fluid impervious coating substantially completely covering both sides of said washer, said coating providing sealing means where said inner and outer perimeters engage said members, whereby said coated washer provides a fluid-impervious partition between said valve body portions.

7. In a valve body member having inlet and outlet parts and a valve disk member controlling fluid flow through one of said ports, said disk member having port opening and closing positions, the combination of an annular Belleville type spring washer in the form of an almost flat truncated cone of sheet material having spring characteristics and having an annular ring of uninterrupted sheet material extending completely around said washer, said washer having its inner and outer perimeters substantially in engagement with said members, said washer being under stress between said members so that the spring characteristic of said washer tends to hold said valve disk member in one of said positions, and sealing means preventing leakage through and around said washer.

8. The combination of claim 7 wherein said sealing means preventing leakage through and around said washer comprises an annular seal between said inner perimeter and one of said members, and an annular seal between said outer perimeter and the other of said members.

9. The combination of claim 7 wherein said sealing means preventing leakage through and around said washer comprises an imperforate flexible diaphragm entirely covering at least one side of said washer and having its inner and outer edges in sealing engagement respectively with said members.

References Cited in the file of this patent

UNITED STATES PATENTS

| 679,062 | Staedeli | July 23, 1901 |
| 814,063 | Morgan | Mar. 6, 1906 |
| 1,693,407 | Shand | Nov. 27, 1928 |
| 1,698,155 | Dorsey | Jan. 8, 1929 |
| 1,783,646 | Hajek | Dec. 2, 1930 |
| 2,162,719 | Hay | June 20, 1939 |
| 2,332,630 | Fawkes | Oct. 26, 1943 |
| 2,460,168 | Caserta | Jan. 25, 1949 |
| 2,488,968 | De Vorss | Nov. 22, 1949 |

FOREIGN PATENTS

| 458,931 | Germany | 1926 |
| 722,180 | France | 1932 |